UNITED STATES PATENT OFFICE.

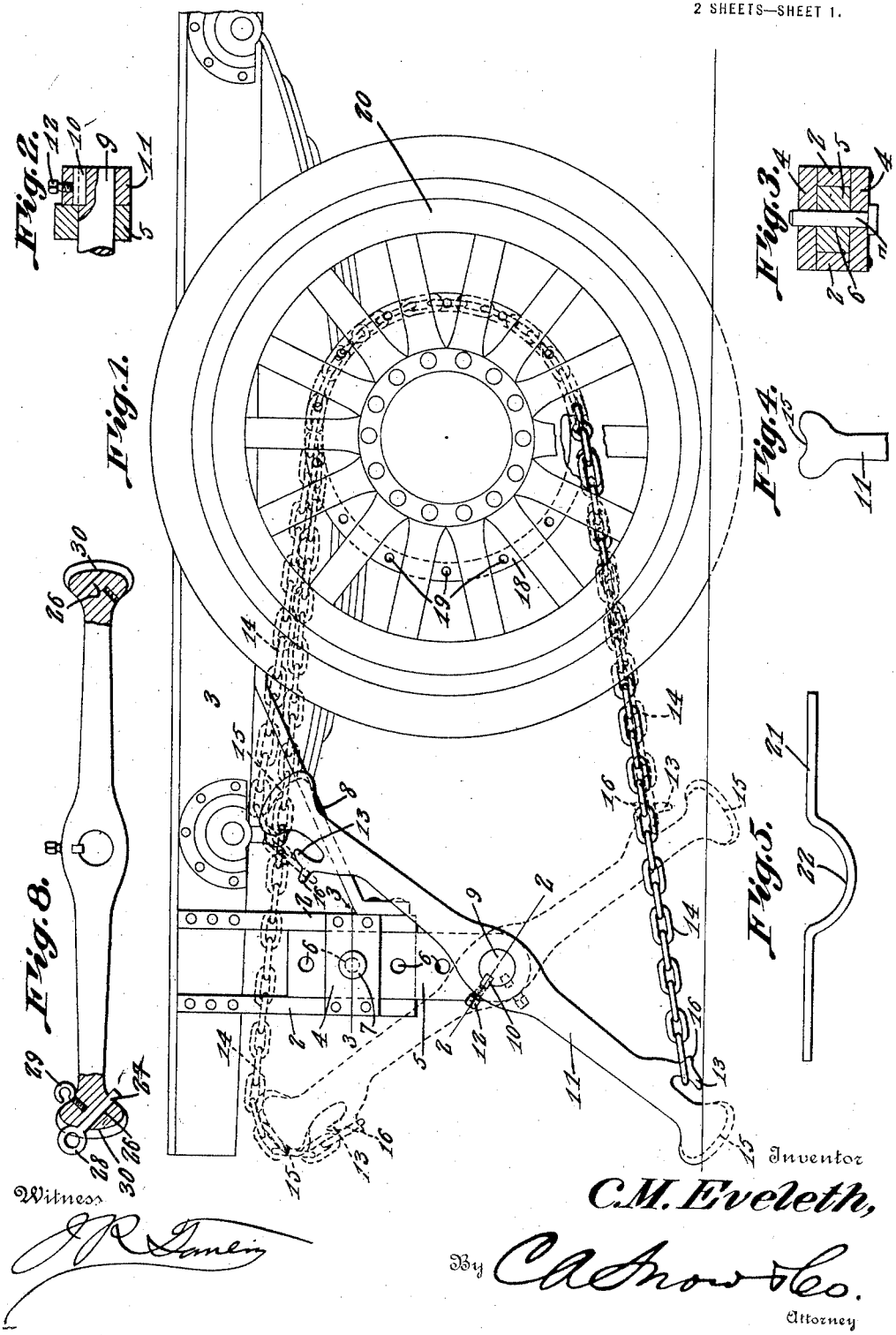

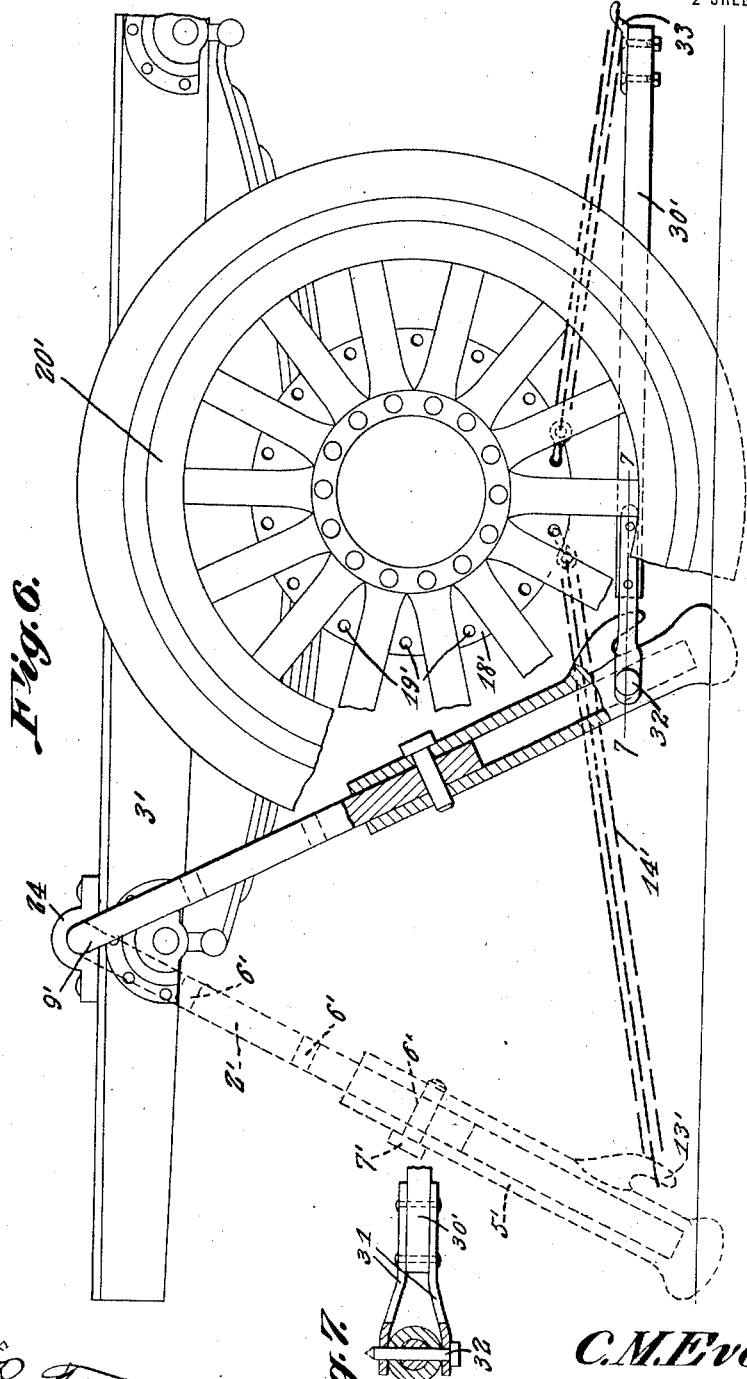

CLARENCE M. EVELETH, OF RIVER FOREST, ILLINOIS.

AUTOMOBILE ATTACHMENT.

1,334,362.  Specification of Letters Patent.  Patented Mar. 23, 1920.

Application filed June 11, 1919. Serial No. 303,286.

*To all whom it may concern:*

Be it known that I, CLARENCE M. EVELETH, a citizen of the United States, residing at River Forest, in the county of Cook and State of Illinois, have invented a new and useful Automobile Attachment, of which the following is a specification.

This invention relates to improvements in automobile attachments, the object of the invention being to provide a device adapted to assist in starting a power-driven vehicle when the same has become stalled on soft or slippery ground, and which may be applied either at the front or rear of the vehicle and in either position may be used to cause the vehicle to move forward or backward.

A further object of the invention is to provide a device of the character set forth which is capable of application to any power-driven vehicle and which is comparatively simple in construction and highly efficient in use.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a side elevation of a portion of an automobile showing my improved device applied thereto;

Figs. 2 and 3 are detail sectional views taken respectively on the lines 2—2 and 3—3 of Fig. 1;

Fig. 4 is a detail side view of the head or chain-engaging end of the lever;

Fig. 5 is an end view of a plate adapted for use with the attachment;

Fig. 6 is a view similar to Fig. 1, but showing a modified form of my attachment, a portion of the latter being shown in section, and the wheel broken away;

Fig. 7 is a sectional view taken on the line 7—7 of Fig. 6; and

Fig. 8 is a side, partly sectional, view of a modified form of lever.

The same characters of reference designate the same parts in the different figures of the drawings.

As is well known, the drive wheels of an automobile frequently spin around when the machine is on soft or slippery ground, so that it is unable to move forward or backward. The present invention is intended to provide a leverage whereby the car is assisted in getting a start.

Referring to Figs. 1 to 4 inclusive, 2 designates a pair of guide bars which are bolted to the side of the supporting beam 3 of the vehicle. A pair of plates 4 are secured one on each side of the bars 2, near the lower ends thereof, the bars 2 and plates 4 thus forming a guide between which is mounted a slidable member 5 provided with a series of openings 6 adapted to register with a pair of registering openings formed in the plates 4, whereby said slide may be retained at varying heights by means of a pin 7, Fig. 3, passing through such openings. A supporting brace 8 is secured at one end to one of the guide bars 2 near the lower end thereof and at its opposite end to the underside of the vehicle supporting beam 3. A duplicate of the structure above described is mounted on the opposite side of the vehicle frame, and in the lower end of each of the slides 5 is formed an opening providing a bearing for a shaft 9 that extends across the vehicle and projects slightly beyond the slide 5, said shaft carrying a key 10 permanently secured thereto at each end thereof. A lever 11 is provided centrally thereof with an opening and a keyway in communication therewith adapted to fit on the end of said shaft, a set screw 12 passing through said lever and adapted to engage the key 10, thereby to rigidly secure the lever on the shaft 9. The lever 11 is provided adjacent to each end thereof with a hook 13, the hooks at opposite ends being on opposite sides of the lever, with which hooks is adapted to be engaged a chain 14, the lever being also provided in each end thereof with a depression or groove 15 for the reception of said chain. The hook is of such formation that it will hold the chain in engagement therewith for causing the vehicle to move forward or backward until the lever is rotated to a certain angle with relation to the chain, whereupon the chain will be automatically released from the hook. For this purpose the hook is provided with a nose 16 formed on the outer side thereof and the first link of the chain is adapted to engage and coöperate with the hook for retaining the chain in engagement therewith. A series of holes may be formed in the brake flange of the wheel, or a grooved flange 18 may be secured to the inner side of the wheel 20 and provided with a series of holes 19, in one of which the opposite end of the chain may be hooked, the chain being provided with any suitable form of hook for this purpose. The groove of the flange thus provides a drum on which the chain may be wound while the wheel rotates.

The device above described is operated as follows: When the vehicle is normally operating the slides 5 are pushed up until their lowermost openings 6 register with the openings in the plates 4 and the pins 7 secured in said openings thereby to hold the slides in elevated position, the levers 11 and chains being removed therefrom and stored away in some convenient place in the machine. When the machine has become stalled in soft or slippery ground and it is impossible, because of the spinning of the wheels, to move the car forward or backward, the slides 5 are lowered to the desired point and the levers 11 secured on the ends of the shaft, the set screws 12 being tightly clamped on the keys 10. If it is desired to move the vehicle forward, the lever is positioned as shown in dotted lines in Fig. 1, the end link of the chain being then hooked over the nose 16 and the chain passed over the upper end of the lever and around the grooved flange 18 and its opposite end hooked into one of the perforations of said flange at the under side thereof. The engine is then started, whereupon the rotation of the wheel will cause the chain to be wound on the grooved flange and thereby pull the upper end of the lever forward, while the lower end of the lever engages the ground, thus causing the vehicle to move forward some distance. As soon as the upper end of the lever has arrived at a position approximately at right angles to the dotted line position shown in Fig. 1, the chain will become disengaged from the hook and may then be removed from the wheel. This operation may be repeated as often as is necessary to carry the vehicle past the bad ground. On the other hand, if it is desired to move the vehicle backward, the lever is placed in the position shown in full lines in Fig. 1 and the first link of the chain engaged with the hook 13 at the lower end of the lever, the chain being then passed around the grooved flange and hooked into one of the openings at the upper side thereof. On starting the engine in reverse the rotation of the wheel backward will cause the lever to rotate so that its upper end will be thrown back of its pivotal connection with the slide 5, while its lower end will be forward of such pivotal connection, and as soon as the lower end has arrived at a position approximately at right angles to that shown in Fig. 1 the chain will disengage the hook in the manner above set forth. It will readily be seen that the device will operate in the same manner whether it is mounted at the rear of the driving wheels or in front thereof, except that the chain would be connected with the opposite ends of the lever from that above described for causing the vehicle to move forward and backward respectively. In the present instance I have provided a plate 21, shown in Fig. 5, having a cupped depression 22 formed therein for the reception of the lower end of the lever. This plate is adapted for use when the ground is very soft and the lever tends to sink. The plate is placed in the proper position on the ground and the end of the lever set within the cupped depression 22. A broad surface is thus provided for engagement with the ground, whereby sinking of the lever is effectually prevented. When the device is not in use, the levers 11, chains 14 and plates 21 may be removed and stored in some convenient out of the way place in the machine.

In Fig. 6 is shown a modified form of the device. In this instance a shaft 9' extends across the vehicle-supporting beams 3' and is rotatably secured thereon by means of bearing blocks 24. This shaft is provided at each end thereof with an arm 2' bent at right angles thereto and carrying at its lower end an extension sleeve 5', which is provided with an opening adapted to register with openings 6' formed in the arm for the passage of a pin 7', thereby to permit the sleeve to be adjusted to various lengths in a manner similar to the slide 5 shown in Fig. 1. The sleeve is closed at its lower end and has formed on one side thereof, adjacent to such end, a hook 13'. The sleeves at opposite sides of the vehicle may, if desired, be connected by a rod secured to the lower ends of the sleeves. In this form of the device, in view of the fact that the lever has but one free end, the vehicle can be caused to move only in one direction by the use of the lever and chain only. For the purpose of causing movement in the opposite direction, I have provided a bar 30' having at one end a pair of plates 31 by means of which the bar may be pivoted adjacent to the lower end of the sleeve 5', as shown at 32, and at its opposite end with an offset member 33 adapted to engage the first link of the chain. The wheel 20' in this instance may be also provided with a grooved flange 18' having openings 19' for connection of the end of the chain 14' in a manner similar to the device shown in Figs. 1 to 4. It is believed that the operation of this device will be readily understood. It will readily be seen that with the chain connected to the forward end of the bar and the bar pivoted to the sleeve as shown in Fig. 6, the leverage will cause movement of the vehicle in the opposite direction from that caused by the lever and chain as shown in dotted lines.

In Fig. 8 is shown a modified form of lever. In this instance the head of the lever is provided with an aperture 26 in which is adapted to be inserted a pin 27 having an eye 28 adapting it for connection with the chain. In this form of the lever the pin, after having been connected with the chain, is inserted in the aperture 26 when the lever is in the position shown in dotted lines in Fig. 1. The pin will bear on the opposite sides of the aperture with sufficient force to prevent it slipping out until the lever has been rocked to a position approximately at right angles to the starting position. For causing movement of the machine backward, the lever is in this instance provided with a hook 29 threaded thereinto, in position to engage one of the links of the chain and to release the same when the lever has been shifted on its pivot in the manner described in connection with Figs. 1 to 4. In this form of the lever the formation of grooves in the ends of the lever for the reception of the chain is unnecessary, since the chain does not pass over the end of the lever. The ends of the lever may, however, be corrugated or roughened, as shown at 30, thereby to provide a road-gripping surface.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims appended hereto.

Having thus described my invention, what I claim is:

1. In a power-driven vehicle, the combination of a pivotally mounted member carried by the frame of the vehicle adjacent to the driving wheel thereof, said member being adjustable with relation to said frame, and motion transmitting means connected to the driving wheel and releasably engaged by said member thereby to cause movement of the vehicle.

2. In a power-driven vehicle, the combination of a pivotally mounted lever carried by the frame of the vehicle adjacent to the driving wheel thereof, said lever being adjustable with relation to the frame, and a flexible element adapted to be removably connected to said lever and to the driving wheel whereby motion of the driving wheel will swing the lever on its pivot into engagement with the ground thereby to cause movement of the vehicle.

3. In a power-driven vehicle, the combination of a depending member secured to the frame of the vehicle, a lever slidably carried by said depending member and adapted to engage the ground, a flexible element adapted to engage the driving wheel of the vehicle, and means carried by the lever for releasably engaging said flexible element whereby rotation of the driving wheel will swing the lever into engagement with the ground thereby to cause movement of the vehicle.

4. In a power-driven vehicle, the combination of a depending member secured to the frame of the vehicle, a slidable member carried by said depending member and adapted to be maintained at different heights, a lever pivotally carried by said slidable member, a flexible element adapted to engage the driving wheel of the vehicle, and a hook carried by said lever at opposite ends thereof in position to releasably engage said flexible element at either end of the lever, whereby motion of the driving wheel will be transmitted to the lever thereby to cause movement of the vehicle in a forward or backward direction.

In testimony that I claim the foregoing as my own, I have hereto affixed my signature in the presence of two witnesses.

CLARENCE M. EVELETH.

Witnesses:
ROBERT F. WITT,
C. F. GRAUZON.